Figure 11:
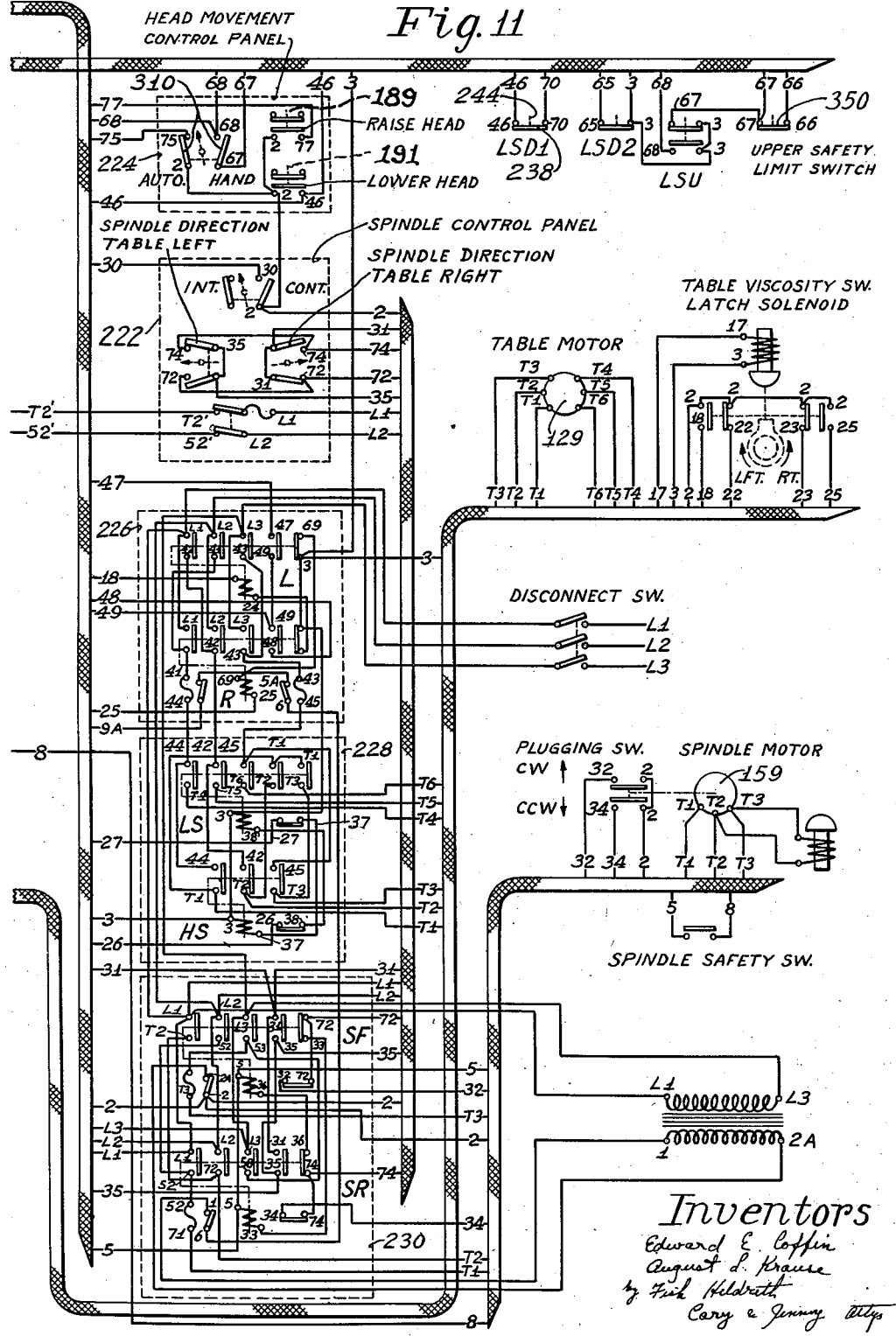

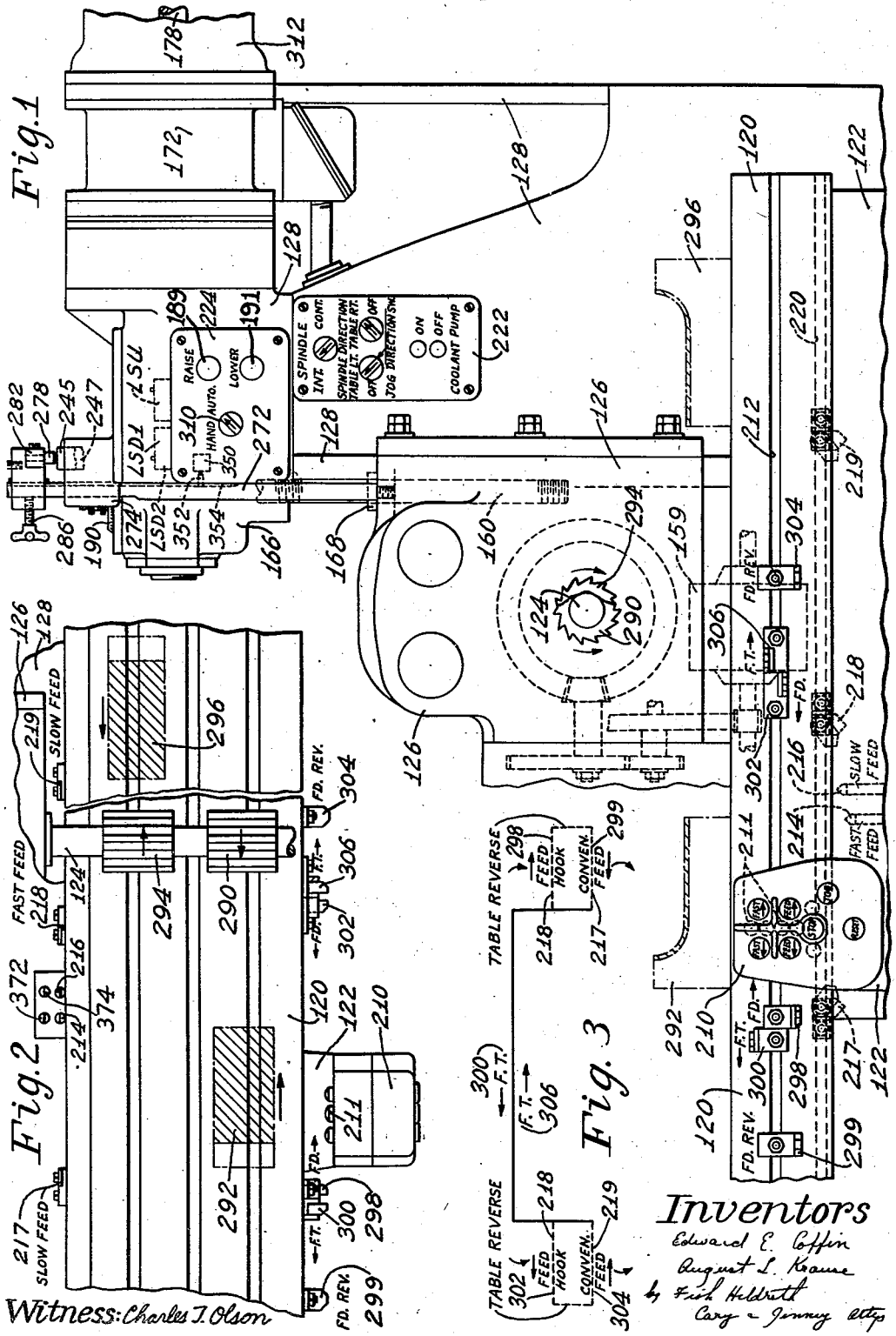

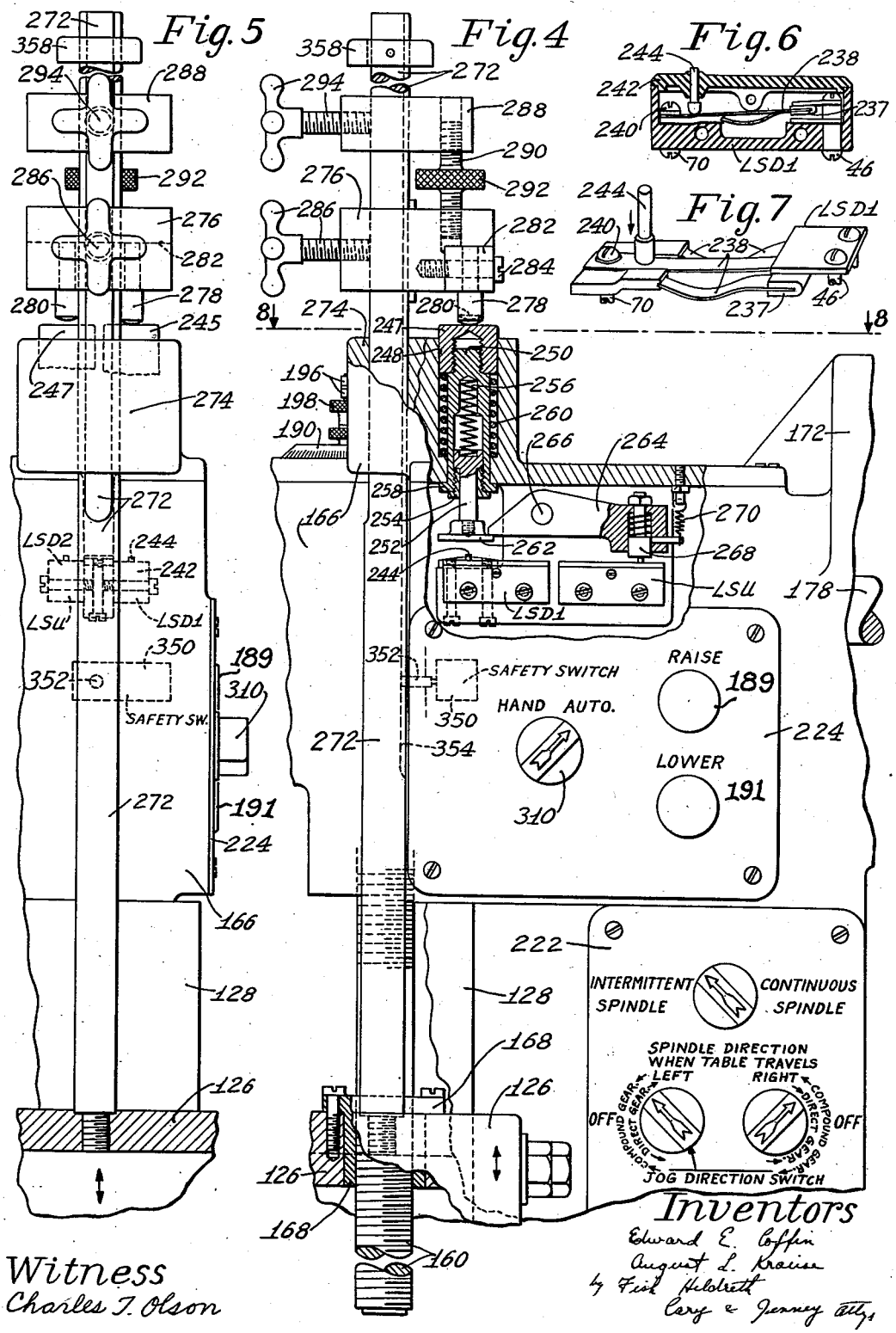

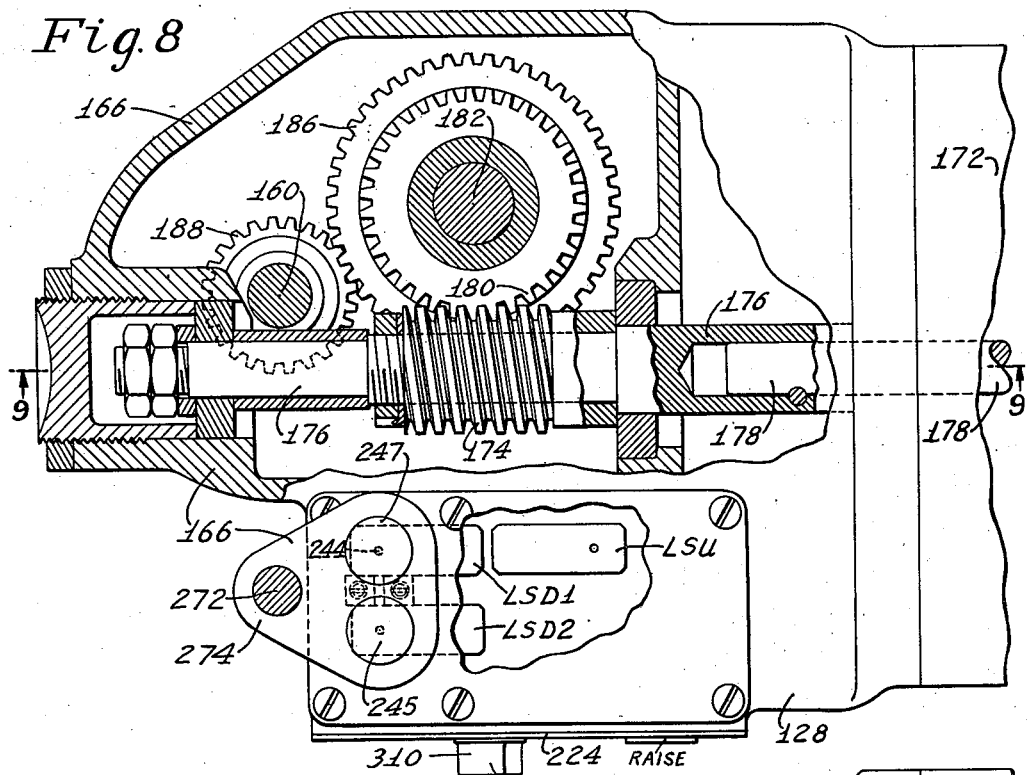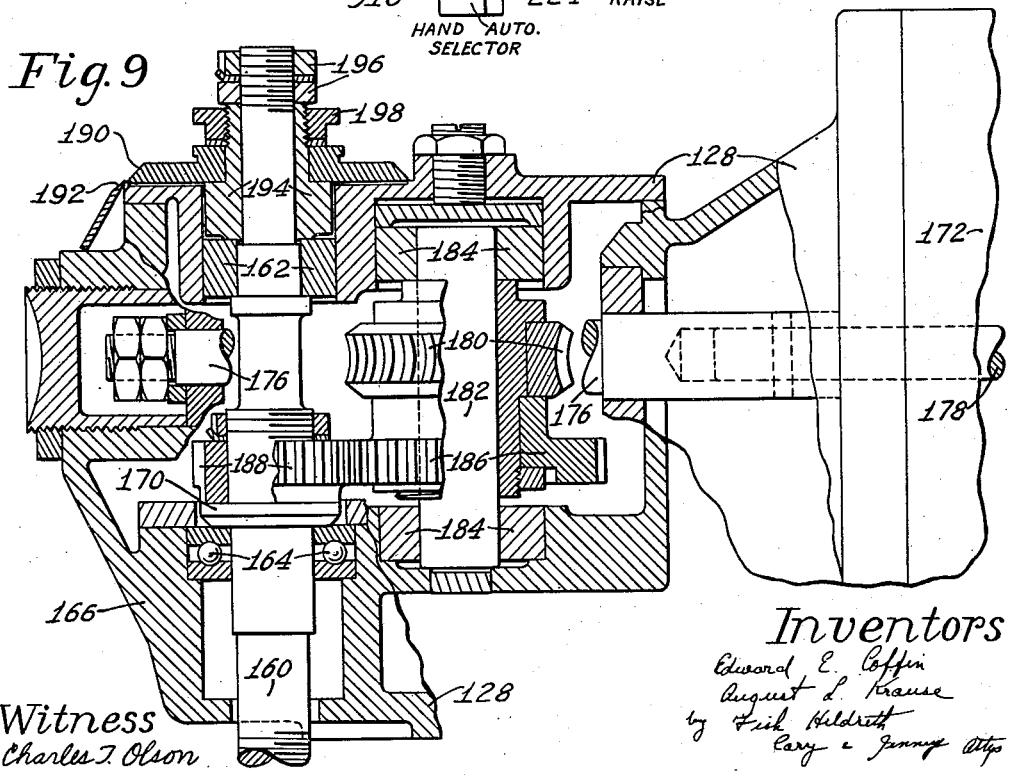

Oct. 15, 1940.  E. C. COFFIN ET AL  2,217,671
MILLING MACHINE
Filed Aug. 18, 1937   7 Sheets-Sheet 4
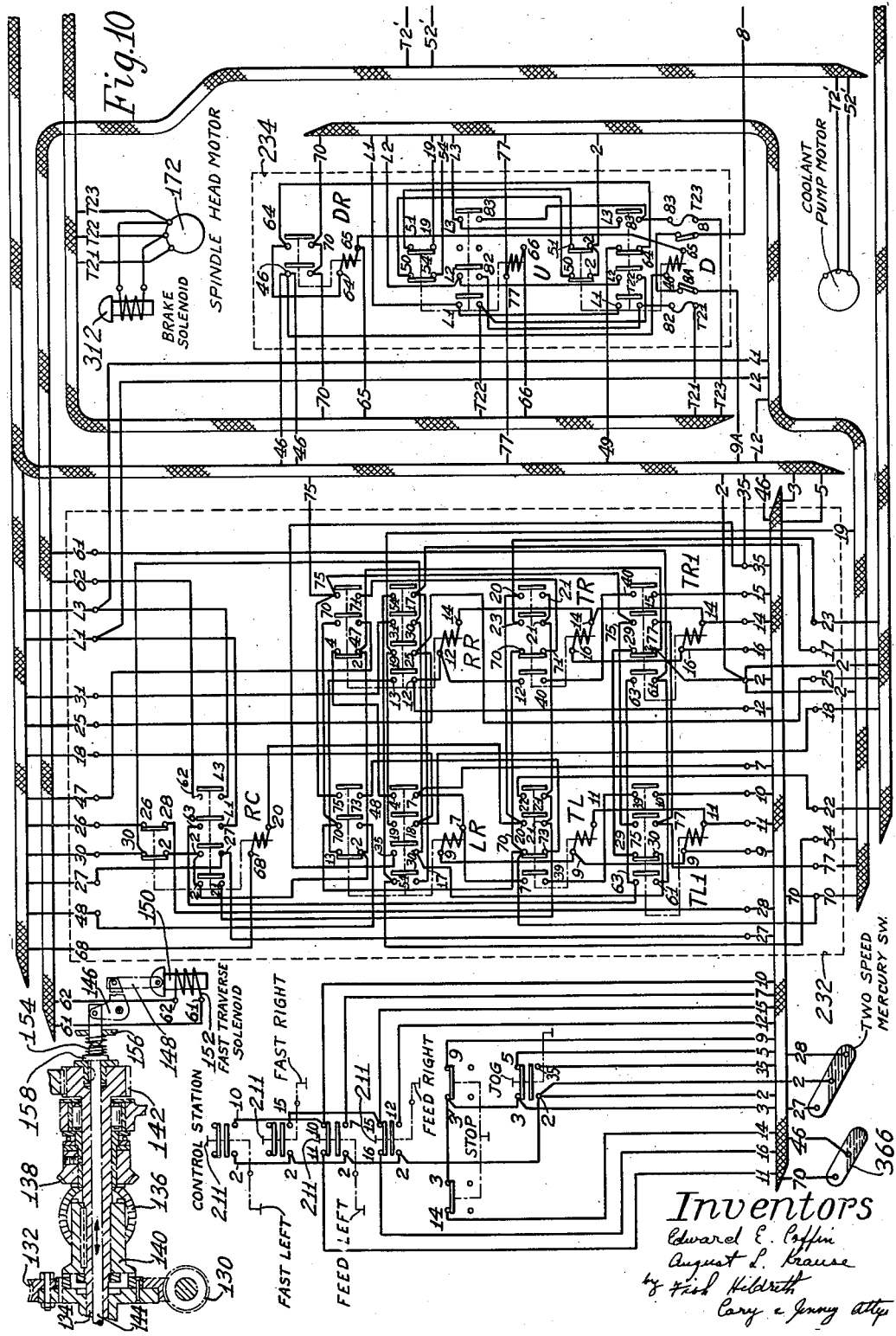

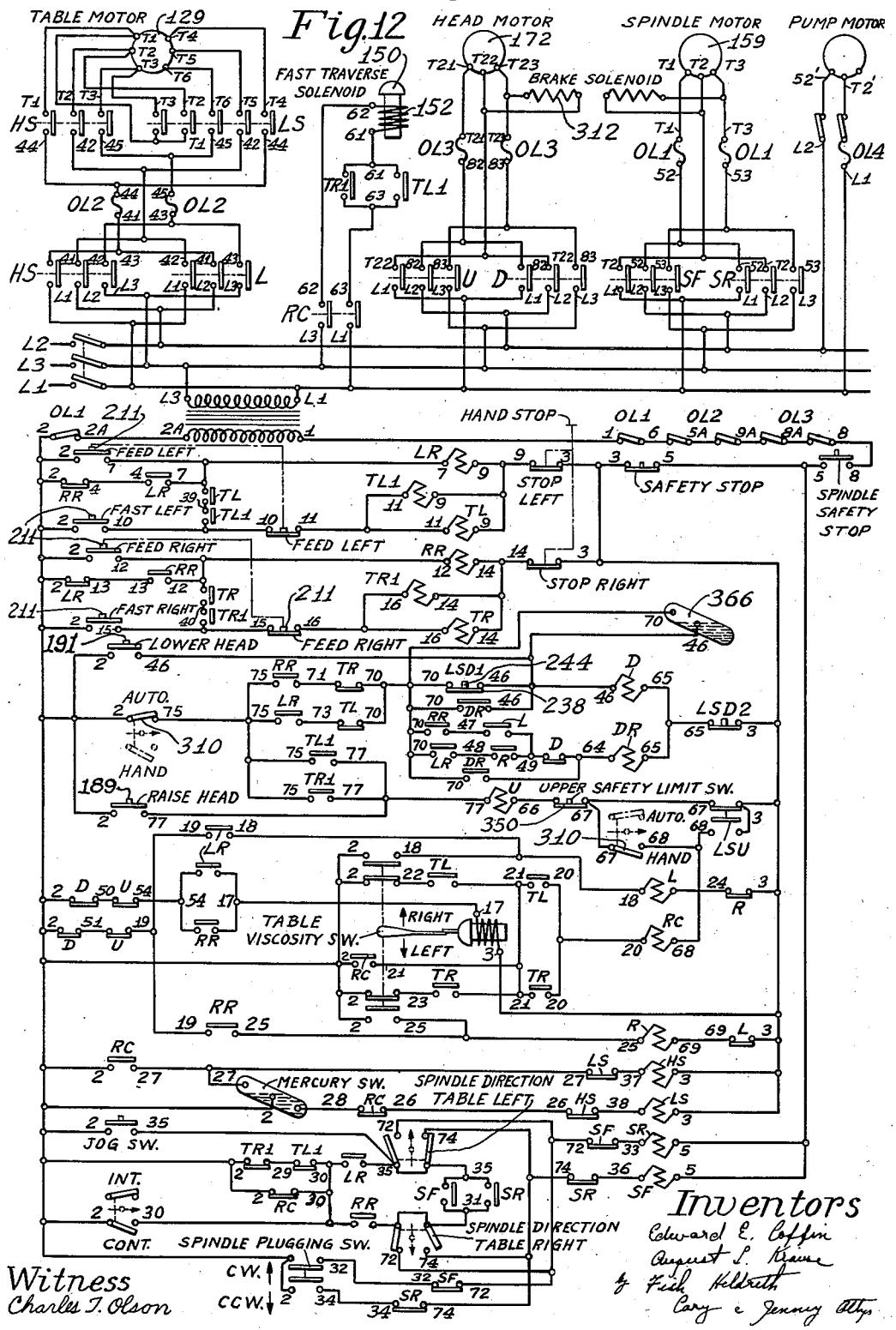

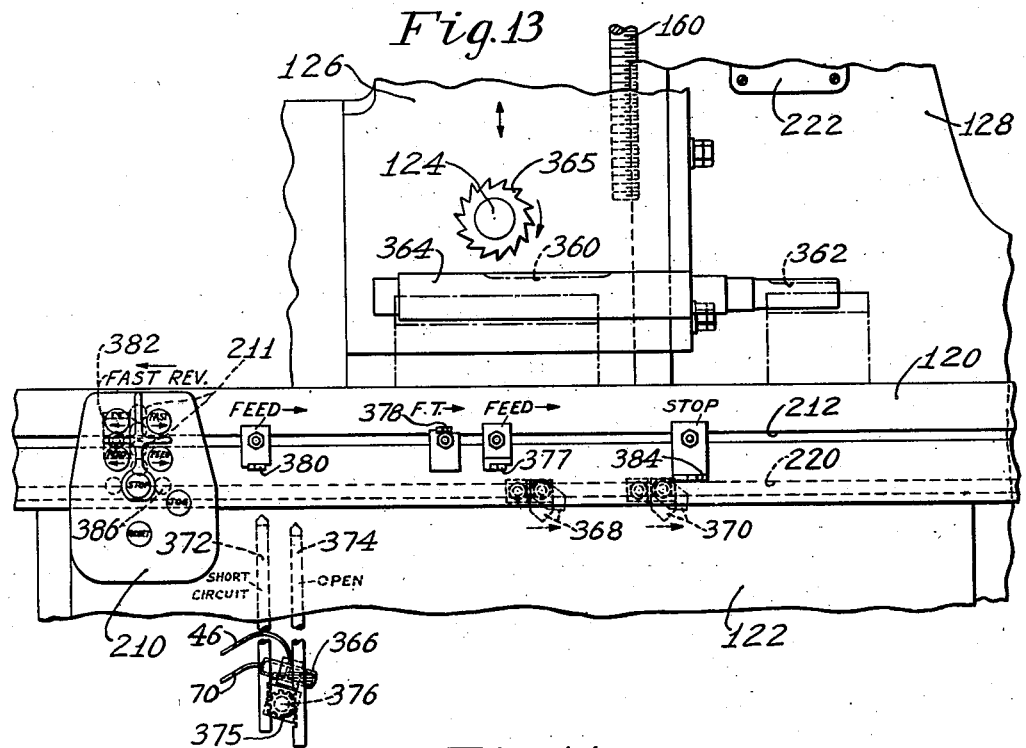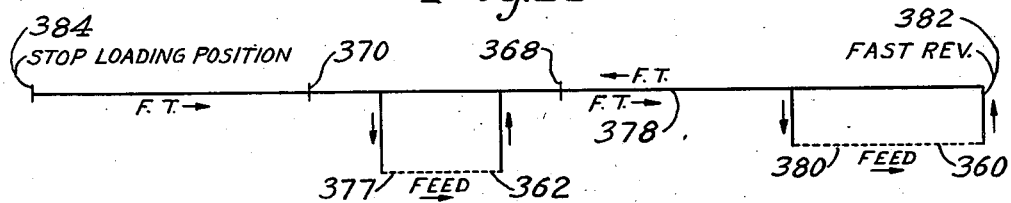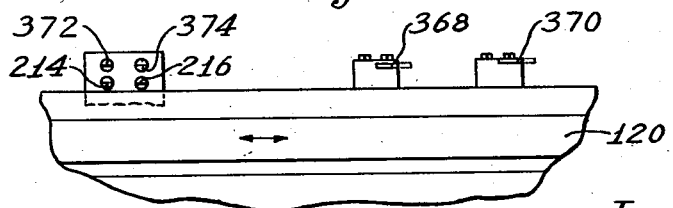

Patented Oct. 15, 1940

2,217,671

UNITED STATES PATENT OFFICE 2,217,671

MILLING MACHINE

Edward E. Coffin and August L. Krause, Providence, R. I., assignors to Brown and Sharpe Manufacturing Company, a corporation of Rhode Island Application August 18, 1937, Serial No. 159,698

23 Claims. (Cl. 90—21)

The present invention relates to improvements in milling machines, and more particularly to improvements in automatic control means for effecting relative translatory movements between a milling cutter spindle and work support for driving the spindle and for effecting relative movement of the cutter spindle toward and away from the work between operative and inoperative positions.

The invention is herein disclosed as embodied in a manufacturing type milling machine having a transversely movable table and a rotary cutter spindle which is supported on a spindle head for vertical adjustment toward and away from the table. The machine disclosed in the drawings, is provided with electrical driving and control devices for operating the table spindle and carriage.

It is a principal object of the present invention to provide novel and improved driving and control devices well adapted for use in a machine of this general description, to provide a more efficient and versatile control of the machine for automatic operation.

It is more specifically an object of the invention to provide a novel control means capable of automatic operation to move the cutter spindle into and out of operating position during the operation of the machine in accordance with a variety of automatic cycles of the machine.

It is a further object of the invention to provide novel electrical control devices well adapted for controlling the operation of a milling machine of the general type herein disclosed, to secure an efficient and accurate control of the several cooperating mechanisms in accordance with a variety of automatic cycles in which the cutter is moved relatively downwardly into work engaging position, and is thereafter moved to a raised inoperative position upon completion of the milling cut.

With these and other objects in view, as may hereinafter appear, the several features of the invention consist in the devices, combinations and arrangement of parts hereinafter described and claimed, which together with the advantages to be obtained thereby will be readily understood by one skilled in the art from the following description taken in connection with the accompanying drawings, in which Fig. 1 is a view in front elevation of a milling machine, only so much of the machine being shown as is believed necessary to illustrate the connection of the present invention therewith; Fig. 2 is a detail plan view of the work table and cutter spindle, illustrating particularly the disposition of the oppositely faced cutters and the work pieces to be engaged thereby; Fig. 3 is a diagram disclosing one operating cycle of which applicant's improved machine is capable; Fig. 4 is an enlarged detail view in front elevation, with a portion of the casing broken away and certain of the parts shown in section to illustrate particularly the electrical control devices including the upper and lower limit switches for positioning the spindle head; Fig. 5 is a view looking from the left, of the parts shown in Fig. 4; Fig. 6 is a detail sectional view in front elevation of one of the limiting switches for controlling the vertical movement of the spindle carriage; Fig. 7 is a perspective view of the switch arm shown in Fig. 6; Fig. 8 is a sectional plan view taken on the line 8—8 of Fig. 4, to illustrate particularly the driving connections for imparting vertical movements to the spindle carriage; Fig. 9 is a sectional view taken on the line 9—9 of Fig. 8; Figs. 10 and 11 taken together, illustrate the complete wiring diagram of the machine; Fig. 12 is an explanatory diagram to illustrate in a simplified form the operating connections illustrated in Figs. 10 and 11; Fig. 13 is a view in front elevation of the machine similar to Fig. 1, but illustrating a different set-up of the table dogs for the milling of two keyways of different levels in a work piece; Fig. 14 is a diagram of the machine operating cycle produced by the setting of the table dogs illuustrated in Fig. 13; and Fig. 15 is a detail plan view illustrating one of the table dogs employed for operating the mercury stwitch to short-circuit lower limit switch LSDI.

The machine disclosed in the drawings as embodying in a preferred form the several features of the present invention. is of the general type disclosed in the patent to Bennett and Krause, No. 2,068,840, dated January 26, 1937, and comprises a work table 120 supported for transverse movements on ways formed on a base 122, and a milling cutter spindle 124 rotatably mounted on a carriage or spindle head 126 which is supported for vertical adjustment on a machine column 128 forming an integral unit with the base 122. The work table of the machine is driven by means of a reversible two-speed electric motor 129 illustrated in Figs. 11 and 12, through mechanical driving connections including a fast-slow clutch which is shiftable to cause the table to be driven from the motor alternatively at a feed or traverse rate. These driving connections as generally shown in Fig. 10 of the drawings, comprise a slow feed gear train including the worm 130 continuously driven from the table motor through connections, not shown, and worm gear 132 loosely supported to turn on a hollow driven shaft 134, and a quick traverse gear train comprising the bevel driving gear 136 continuously driven from the table motor through connections, not shown, and gear 138 loosely sleeved on the shaft 134. There is also rigidly keyed to the shaft 134, a fast-slow clutch member 140, which is shiftable between alternative driving positions in which the clutch sleeve 140 and shaft 134 are positively driven from the feed worm gear 132, or from the fast traverse bevel gear 138. The shaft 134 is provided at its right hand end with a gear 142 which is operatively connected to drive the table. For controlling the position of the clutch, the shaft 134 has journalled therein a control shaft 144 which is connected at one end by means of a bell-crank 146 and link 148 to the armature 150 of a solenoid 152. A compression spring 154 supported between a stationary member 156 and a collar 158 on the control shaft 144, tends normally to maintain the clutch member 140 in its position to the left in engagement with the slow feed worm gear 132. The cutter spindle 124 is driven from a reversible electric motor 159 and reduction gearing carried on the head 126 as shown in dotted lines in Fig. 1 of the drawings. Inasmuch as these connections for driving the table and spindle, have been fully described and illustrated in the patent to Bennett and Krause above referred to, and form specifically no part of the present invention, further illustration thereof is believed unnecessary.

The machine disclosed in the drawings, is provided with automatic means for raising and lowering the spindle 124 and spindle head 126 on the column 128. This mechanism, as best shown in Figs. 4, 8 and 9, comprises a vertical elevating screw shaft 160 rotatably supported adjacent its upper end in bearings 162 and 164 in an overhanging portion 166 of the column 128, and at its lower end having a screw-threaded engagement with a stationary nut 168 rigidly secured to the spindle head 126. In order that the screw 160 may be supported against endwise movement in the machine, the bearing 164 takes the form of an end thrust bearing which engages with a collar 170 rigidly secured to the elevating screw shaft 160. The shaft 160 is power driven to raise and lower the cutter spindle 124 and spindle head 126 by means of an electric motor 172 supported on the column 128. The driving connections from the motor 172 comprise a worm 174 supported on a transversely extending shaft 176 keyed to the armature 178 of the motor 172, and arranged to mesh with a worm gear 180 on an intermediate drive shaft 182 mounted in suitable bearings 184 in the overhanging portion 166 of the column 128. A gear 186 also secured to the intermediate drive shaft 182 meshes with a gear 188 on the elevating screw shaft 160.

The operation of the electric motor 172 may be controlled automatically from the table dogs in accordance with a predetermined operating cycle of the machine, or manually by means of the raising and lowering switch buttons 189, 191, depending upon the setting of the hand-automatic switch knob 310 hereinafter more fully to be described. The manual switch buttons 189, 191 may be employed in connection with a measuring device to secure a fine manual adjustment of the vertical position of the cutter spindle 124 and the spindle head 126. To this end a dial 190 is supported on the elevating screw shaft 160 which is graduated to measure the amount of the adjustment produced by turning the elevating screw shaft 160 with relation to a stationary marker 192 (see Fig. 9) to the nearest thousandth of an inch. The dial 190 is mounted on a sleeve member 194 supported on the elevating screw shaft 160 between the bearing or bushing 162 and two lock nuts 196 screw-threaded to the shaft 160. The dial 190 is rigidly clamped to the sleeve 194 between a shouldered portion of the sleeve and a knurled nut 198 screw-threaded thereon. Prior to making a manual adjustment in the vertical position of the spindle head, the nut 198 is backed off to release the dial 190 which is then turned to zero position with relation to the marker 192, and again clamped to the elevating screw shaft 160.

The machine illustrated in the drawings, is provided with an electrical control system which is in many respects similar to that illustrated and described in the patent to Bennett and Krause above referred to, including feed and traverse switch control elements operable either manually or by means of table dogs to control the direction, rate of travel, and starting and stopping of the table, together with controls operable automatically or manually for starting and stopping and determining the direction of rotation of the cutter spindle. As in the Bennett and Krause patent above referred to, there is also provided an additional switch control operated by table dogs to cause the table to be driven alternatively at either of two feeding rates.

In accordance with a principal feature of the present invention, electrical devices are provided for controlling the operation of the spindle head motor 172 which are constructed and arranged to cooperate with electrical devices for controlling the operation of the table and rotary milling cutter to cause the machine to operate in accordance with a variety of novel operating cycles in which the vertical movement of the spindle head is coordinated with the table and cutter spindle drives. The electrical connections for controlling the operation of the head motor 172 are constructed and arranged to cause the spindle carriage 126 to be raised to inoperative position when the table is driven at a quick traverse rate, and to lower the head to bring the milling cutter into operative position whenever the table is shifted to a feed rate. These controls are further arranged to cause the table to be stopped during the raising or lowering of the spindle carriage, so that the cutter will be moved vertically into and out of operation relative to the work.

The electrical devices herein disclosed for controlling the raising and lowering of the spindle head, are well adapted also for use in an automatic milling cycle of the general type illustrated in the copending application of August L. Krause, Serial No. 159,699, filed of even date herewith, in which the direction of rotation of the cutter spindle is reversed at an intermediate point in the travel of the table in each direction to permit the performance of successive hook milling and conventional milling cuts at different levels on work pieces supported in the path of each of said cutters, and to permit the replacing of each work piece when finished while a similar operation is being performed on another work piece located on another part of the table.

Further in accordance with the present invention, upper and lower limit switches are provided for controlling the extent of the raising and lowering movement of the cutter spindle, which are well adapted for automatic operation to enable successive cuts to be made in a work piece at different depths in one operating cycle of the machine.

As best, shown in Fig. 1 of the drawings, the table operating controls include the manually operable Fast left, Fast right, Feed left, Feed right, and Stop switch control buttons supported on a control post 210 mounted on the machine base 122 adjacent the front side of the work supporting table 120, together with corresponding dog actuated control plungers 211 for operating each of these switches mounted on the rear side of the post 210 as generally indicated in dotted lines in Fig. 1. The plungers 211 engage respectively with correspondingly designated table dogs adjustable supported in a T-shaped slot 212 formed on the front side of the table 120. For enabling the table to be driven at either of two desired feed rates, there are also provided at the rear side of the table, two vertically movable dog actuated plungers 214 and 216 shown in dotted lines in Fig. 1, and arranged to be operated by dogs such as those shown at 217, 218 and 219 (Fig. 2) adjustably supported in a T-shaped slot 220 on the rear side of the table. The plungers 214 and 216 operate to control the position of the mercury switch illustrated in the electrical diagram Figs. 10 and 12. The downward movement of the plunger 214 serves to close the mercury switch contact 2—27, causing the table to be driven at the relatively faster feed rate, whereas, the downward movement of the plunger 216 operates to close the mercury switch contact 2—28, causing the table to be driven at the relatively slower feed rate. Inasmuch as the mechanical connections, not here shown, for controlling the operation of the mercury switch, are fully described and illustrated in the patent to Graves and Bennett No. 2,077,408, dated April 20, 1937, for Machine tools, and form specifically no part of the present invention, no further description thereof is believed necessary.

The operation of the spindle motor 159 and cutter spindle 124 is controlled automatically during the operation of the table in accordance with the setting of a number of spindle control switches supported on a panel 222 on the machine column 128 (see Fig. 1). These controls as set forth in the captions on the panel 222, provide for alternative continuous or intermittent operation of the spindle, and further determine the direction of spindle rotation during table travel in each direction.

The raising and lowering of the spindle head 126 may be controlled automatically in accordance with any one of several operating cycles of the machine, or manually by means of control elements supported on a panel 224 on the machine column 128. These controls include manually operable raising and lowering buttons and a hand-automatic selector control knob, as indicated in the captions on the control panel 224 (see Fig. 1).

The construction and operation of the electrical connections for controlling the operation of the table, the cutter spindle and the spindle head elevating screw respectively through their driving motors, will be briefly described in connection with the electrical wiring diagram (Figs. 10 and 11) and the explanatory diagram (Fig. 12) so far as necessary to make clear the connection therewith of the several new and patentable features of construction and operation of the machine above set forth.

The table, spindle, and spindle head motors are driven from a three-phase power line designated as L1, L2 and L3. The table motor 129 is controlled by a reversing switch having two exciting relays L and R. The main switch for the table motor is supported on a panel indicated in dotted lines at 226 (see Fig. 11), and comprises two sets of contacts which are controlled by the relay coils L and R respectively to connect the motor and table for right or left hand operation. The high speed and low speed switch of the table motor is mounted on a second panel indicated at 228 in dotted lines, and comprises two sets of contacts controlled respectively by the relay coils HS or LS for high speed or low speed operation of the table motor.

On another panel indicated at 230 in dotted lines, are carried the main switch contacts for the spindle motor 129 controlled by means of two relay coils SF and SR for opposite directions of rotation of the motor and spindle driven thereby. It will be noted that the spindle motor control panel 222, and the spindle carriage motor control panel 224 previously described, together with the switches operated by the several control knobs thereon, are diagrammatically shown in Fig. 11.

On another panel indicated at 232 in dotted lines (Fig. 10), are a number of secondary relay switches which are arranged to control the operation of the table and spindle switches above described, together with the solenoid 150 which operates the slow feed and quick traverse clutch 140, and under certain operating conditions, as hereinafter more fully set forth, the operation of the spindle head motor 172 to raise and lower the spindle. These secondary relays comprise the secondary coils LR and RR controlled respectively by the left and right feed buttons, the coils TL and TR controlled respectively by the left and right quick traverse buttons, the secondary relay coil RC which controls the operation of the slow feed and quick traverse clutch solenoid 150, and two additional relays TL1 and TR1 which are connected in parallel with the relays TL and TR and have a duplicate action to control the operation of certain secondary switch connections as hereinafter more fully set forth.

The main switch connections for controlling the operation of the spindle head motor 172, are supported on a panel shown in dotted lines in Fig. 10 indicated at 234, and comprise two sets of contacts which are controlled by relay coils D and U respectively, to connect the motor 172 and cutter spindle 124 for upward or downward movement. An additional switch controlled by a relay DR is provided for connecting the motor 172 and cutter spindle for an additional increment of downward movement when it is desired to secure a second finishing cut at a greater depth, and during movement of the table in a reverse direction.

For controlling the operation of the spindle head motor 172 to cause the cutter spindle 124 to be raised or lowered to the desired inoperative or operative positions, there are provided on the casing 166, three limit switches including a double contact upper limit switch LSU for arresting the upward movement of the cutter spindle, and two single contact lower limit switches LSD1 and LSD2 for arresting the downward movement of the cutter spindle alternatively in one of two operating positions (see Figs. 1, 8, 11 and 12). The construction and mode of operation of these switches which are of the same general type, will be understood from Figs. 6 and 7, showing in detail the construction of the lower limit switch LSD1. This switch comprises contact member 237 mounted on a spring contact arm 238 which is rigidly secured by means of a bolt 240 in a casing 242, and is normally maintained in a raised position to close the contacts 70—46. A small actuating pin 244 slidably mounted in the casing, engages at its lower end against the spring switch arm 238, and at its upper end projects upwardly through the casing 242. The parts are so arranged that a downward pressure on the pin 244 acts to snap the spring switch arm 238 downwardly to open position, as shown in Fig. 7.

The operation of the upper and lower limit switches above described, is controlled by the movement of the spindle head 126 through connections which, as best shown in Figs. 4 and 5 of the drawings, comprise two compound plungers 245 and 247 slidably supported in the overhanging portion 166 of the column 128, the plunger 245 being arranged to operate the lower limit switch LSD1, and the plunger 247 being arranged to operate the lower limit switch LSD2 and the upper limit switch LSU. The compound plunger 247, as best shown in Fig. 4, comprises a cap member slidably supported within a bore 248 in the casing 166, and having screw-threaded thereto, a tubular member 250 within which is slidably mounted a switch contact plunger or pin 252. The pin 252 is normally maintained in a fully extended downward position with relation to the tubular member 250 in which the enlarged head of the pin 252 engages against a collar 254 screw-threaded into the lower end of the tubular member 250 by means of a small compression spring 256. The entire plunger unit is held yieldingly in a limiting raised position in which the flanged lower end 258 of the member 250 engages against the casing 166 by means of a compression spring 260 coiled about the member 250 between a shoulder formed in the bore 248 and the abutting end of the cap 247. A flat disk 262 screw-threaded to the lower end of the pin 252, is arranged for engagement during the downward movement of the plunger with the actuating pin 144 for the lower limit switch LSD2. Upward movement of the compound plunger 247 to the raised position illustrated in Fig. 4, is arranged to cause the actuation of the upper limit switch LSU through connections which comprise a switch lever 264 supported on a stationary pivot 266, and having one end thereof arranged to overlie the disk 262. The other end of the switch arm 264 is provided with a spring-pressed plunger 268 which is arranged when the switch arm 264 is rocked in a clockwise direction as viewed in Fig. 4, to engage with the actuating pin for the upper limit switch LSU. A small tension spring 270 connected between the switch arm 264 and the stationary portion of the machine frame, tends to move the switch lever 264 and plunger 268 to a raised position when released by the downward movement of the plunger 247.

Inasmuch as the compound plunger 245 for actuating the lower limit switch LSD1 is identical in its construction and mode of operation with the plunger 247 above described, no detailed description thereof is believed necessary.

The compound plunger units 245 and 247 above described, are arranged to be acted upon by means of an adjustable stop mechanism which is movable with the spindle head 126 to cause the actuation of the lower limit switches LSD1 and LSD2 and the upper limit switch LSU. This stop mechanism comprises a vertical stop rod 272 screw-threaded at its lower end into the spindle head 126 to move therewith, and slidably supported toward its upper end in a bearing 274 formed in the overhanging portion 166 of the column 128. The stop rod 272 has supported thereon a stop bracket 276 which carries two stop pins 278 and 280 arranged for engagement respectively with the compound plungers 245 and 247. In order to permit the replacement of the stop pins 278 and 280, these pins are mounted in a removable block 282 rigidly secured to the bracket 276 by means of a clamping screw 284. The bracket 276 is rigidly secured in adjusted position on the stop rod 272 by means of a clamping screw 286.

In order to secure a fine adjustment in the position of the stop bracket 276 and stop pins 278 and 280 on the stop rod 272, a second stop bracket 288 is mounted on the stop rod 272, and is connected to the stop bracket 276 by means of an adjusting screw 290 having formed thereon a knurled head 292, and having the opposite ends thereof screw-threaded respectively into the brackets 276 and 288. These screw threads have a slightly different pitch, so that rotation of the adjusting screw 290 after the clamping screw 286 has been backed off, will operate to produce a fine adjustment of the stop bracket 276 lengthwise of the stop rod 272. A clamping screw 294 is provided to secure the bracket 288 rigidly to the stop rod 272.

The operation of applicant's mechanism for controlling the operation of the limit switches LSU, LSD1 and LSD2 to arrest the upward and downward movement of the spindle carriage and cutter spindle in the desired position, may be briefly described as follows:

Assuming that the spindle carriage is in its raised inoperative position as shown in Fig. 4, and that the spindle head motor 172 has been started to move the spindle carriage downwardly, the stop 278 engaging against the plunger 245 will operate to depress the plunger. This downward movement will continue until the plunger engages with and depresses the pin 244 to actuate the limit switch LSD1, thus stopping further downward movement of the carriage. Any overrunning of the spindle head 126 during its downward movement, will be taken care of by the yielding connection within the plunger itself which, as previously pointed out is identical in all respects with the plunger 247 above described. When during the subsequent operation of the machine, the spindle head motor is again rendered operative to continue the downward movement of the spindle carriage for a second cut at a greater depth, the pin 280 engages against and depresses the plunger 247 causing the disk 262 on the plunger 247 to engage with and operate the limit switch LSD2 to again stop the spindle motor. Assuming now that the spindle head motor 172 has been again rendered operative to raise the spindle, the upward movement of the stop rod 272 and stop pins 278, 280 therewith will permit the compound plungers 245, 247 to rise under the influence of their springs 260 until the flanged disk 262 associated with plunger 247 engages with and turns the switch lever 264 about its pivot 266 to cause the plunger 268 to engage with and operate the upper limit switch LSU to again stop the spindle motor 172.

Figs. 1, 2 and 3 of the drawings, illustrate a representative set-up of applicant's machine for automatic operation in which successive rough hook milling and finish conventional milling cuts are performed by a milling cutter 290 at different levels upon a work piece 292 mounted toward the left hand end of the work supporting table 120, and in which successive rough hook milling and finish conventional milling cuts are taken by an oppositely faced cutter 294 at different levels upon a work piece 296 supported toward the right hand end of the table 120. In accordance with the set-up of the machine illustrated, each hook milling cut is performed at a relatively faster feed rate, the following finish conventional milling cut at the lower level being performed at a slower rate in order to produce a finely milled surface on the work. Assuming that the table is started from an intermediate position as shown in Fig. 2, the operator presses the fast-right button, causing the table to move at a quick traverse rate to the right, the milling cutter head 126 being at this time in the raised inoperative position illustrated in Fig. 4. As the cutter 290 approaches the work piece 292, the feed dog 298 actuates the feed right switch which operates through the electrical connections hereinafter more fully to be described, to stop the table motor and to start the spindle cutter head 126 feeding down. As the cutter 290 reaches operating position, the lower limit switch LSD1 is actuated by the downward movement of the plunger 247 contacted by the stop pin 278 and operates to arrest the downward movement of the cutter, to start the table feeding to the right, and to start the cutter spindle 124 rotating in a counterclockwise direction for the performance of the hook milling operation on the work piece 292. This movement of the table takes place at the relatively faster feed rate due to the previous engagement of the fast feed dog 218 with the fast feed plunger 214.

When the table has moved to the right a sufficient distance to bring the cutter 290 against the shouldered end of the work piece 292, the reversing feed dog 299 actuates the feed left switch to reverse the direction of table travel. The actuation of this switch operates to again start the milling cutter head 126 feeding down, until arrested by the opening of the second lower limit swtich LSD2 through the operation of plunger 245 when contacted by the stop pin 280. During this down movement of the spindle head 126, the table is held stationary. The operation of the second lower limit switch LSD2 operates to start the table moving to the left, while the cutter spindle 124 continues to rotate in a counterclockwise direction for the performance of the second finish conventional milling cut at the lower level. At the instant of reversal, the slow feed dog 217 on the rear side of the table, contacts with the slow feed plunger 216 to cause the table motor to be driven during the second milling operation at the slower feed rate.

At the completion of the finish milling cut on the work piece 292, the table fast left switch is actuated by contact with a fast left dog 300 which operates first to stop the table 120 and spindle rotation, and then to start the milling cutter spindle head 126 feeding upwardly to its inoperative position in which the flanged disk 262 of the plunger 247 acting on the switch lever 264, causes the actuation of the upper limit switch LSU, thus arresting the upward movement of the spindle head 126. The actuation of the upper limit switch LSU also operates to start the table moving at quick traverse to the left. During this traverse movement of the table, the fast feed dog 218 again contacts with the fast feed plunger 214, so that the table motor switch control will automatically be set for operation of the table at the relatively faster feed rate. The operation of the machine to cause successive rough hook milling and finish conventional milling cuts to be performed by the cutter 294 on the work piece 296, is controlled through the agency of feed left dog 302, feed reversing dog 304 and the fast traverse right dog 306, and through the agency of slow feed dog 219 acting on the slow feed plunger 216, the operation of the machine as controlled by these dogs being identical in every respect with that described in connection with the milling of the work piece 292 at the left hand end of the table.

The operation of the electrical connections to cause the machine to operate in accordance with the automatic cycle above described, may be briefly described as follows:

It is assumed that the spindle head raising and lowering hand-automatic switch 310 is set for automatic position, the spindle intermittent-continuous switch is set for intermittent operation, and that the spindle direction table left and table right switches are set respectively for clockwise operation of the spindle during the travel of the table to the left, and for counterclockwise operation of the spindle during the travel of the table to the right. It may be assumed further that the adjustment and relative length of the stop pins 378 and 280 has been chosen to cause the spindle head 126 and cutter supported thereby, to move correctly to each of the two rough and finish milling positions.

When the operator presses the fast right button, relays TR, TR1 and RR are energized and held in by holding contacts RR 13—12, TR 12—40 and TR1 40—15. The closing of contact RR 19—25 energizes contactor R which causes the table motor to start driving the table to the right. At the same time contacts TR 23—21 and TR 21—20 close energizing contactor RC assuming LSU 68—3 is closed. Contact TR1 63—61 has already closed so the fast traverse solenoid is energized, thereby placing the table in fast traverse right. The spindle motor is prevented from starting because contacts RC 2—30 and TR1 2—29 are held open.

It will readily be seen from the foregoing description, that the upper limit switch LSU operates as a safety device to prevent the starting of the table at quick traverse until the spindle cutter head 126 has been fully raised to its upper position. Furthermore, inasmuch as the LSU upper limit switch contact 68—3 remains closed against the pressure of the spring 270 (see Fig. 4) only while the plunger 247 is in its fully retracted position, any movement of the cutter spindle downwardly from its fully raised position, must immediately operate to de-energize RC, and thus stop further quick traverse operation of the table.

As the cutter spindle 124 approaches the work piece 292, the feed dog 298 actuates the feed right switch, closing contact 2—12 and opening contact 15—16, which de-energizes the TR and TR1 relays, leaving RR energized. TR 71—70 closes, energizing contactor D which starts the spindle head motor feeding the spindle head down. At the same time, contacts D 2—50 and D 2—51 open, thereby disconnecting the table motor and allowing it to stop by plugging. By this time the spindle 124 has started to rotate in a counterclockwise direction through the closing of contacts RC 2—30 and TR1 2—29, which operate to complete the circuit through the spindle direction table right switch contacts 31—72 to energize the spindle motor contactor SR. When the spindle head has been fed down to the rough hook milling cut position, lower limit switch LSD1 is actuated through the operation of plunger 245 contacted by stop pin 278. The opening of the LSD1 contact 70—46 operates to de-energize the spindle head motor switch relay D, thereby stopping further downward movement of the spindle head 126.

In order to provide for the substantially instantaneous stopping of the spindle head, an electrically operated friction brake, not specifically illustrated, is arranged to act on the armature shaft 178 of the spindle head motor 172 to arrest further rotation of the motor. The operation of the brake is controlled by means of a brake solenoid 312 shown in Fig. 10, which operates to apply the brake whenever the motor is de-energized. The braking action thus obtained, is of particular advantage in connection with the spindle head vertical movement to prevent vertical movement of the spindle head during the performance of milling cuts on the work.

When the contactor D is de-energized as above set forth, contact D 2—51 closes, energizing contactor R, so that the table starts feeding to the right, causing the cutter 290 to perform a rough hook milling cut on the work piece 292. The engagement of the fast feed dog 218 with the fast feed plunger 214 during the previous quick traverse of the table to the right, has in the meantime shifted the mercury switch from the position shown in Fig. 12, to open the mercury switch contact 2—28, and to close the mercury switch contact 2—27, so that contactor HS is energized to drive the table motor at the faster feed rate.

When this roughing cut on the work piece 292 is completed, the table feed reversing dog 299 operates the feed left switch, closing contact 2—7 and opening contact 10—11, which de-energizes contactor RR and which in turn energizes contactor LR. Due to the overlapping action of relays LR and RR, contacts LR 70—48 and R 48—49 are closed simultaneously for a space of time long enough to allow relay DR to be energized. The contactor DR is then held in through the holding contact DR 70—64. Contact DR 70—46 short-circuits lower limit switch LSD1 which is now open due to the operation of the switch plunger 247, and allows contactor D to energize, thereby starting the spindle head feeding down to a second level which is determined by the engagement of the stop pin 280 with plunger 245 to open the lower limit switch LSD2. During this downward feeding movement of the spindle head 126, the table remains stopped due to the opening of contact D 2—51. The opening of the switch LSD2 when the spindle head 126 reaches the lower level, causes contact D 2—51 to close, establishing a circuit through contact LR 19—18 to energize contactor L, thereby starting the table motor to feed the table to the left. The cutter spindle 124 is in the meantime kept rotating in a counterclockwise direction through the operation of the holding circuit contact SR 35—31. At the moment of reversal of the table, the slow feed dog 217 engages with the slow feed plunger 216 to reverse the mercury switch to the position shown in Fig. 12, opening the mercury switch contact 2—27, and closing contact 2—28, so that the relay HS is de-energized, and LS is energized to drive the table motor 129 at the slow feed rate.

Upon the completion of the finishing cut, the fast traverse left dog 300 operates the fast left switch, closing contact 2—10 to energize TL and TL1, which are held in by the closing of the holding circuit contacts TL 7—39 and TL1 39—10. As TL1 75—77 closes, it energizes contactor U through the upper limit switch LSU contact 67—3. Contactor U starts the spindle head motor 172 which drives the spindle head 126 upwardly until the upper limit switch LSU is actuated by the upward movement of switch plunger 247 acting through connections above described including the switch actuating lever 264 (see Fig. 4). During the operation of raising the spindle head, contact U 51—19 remains open, thereby stopping the table. The actuation of the upper limit switch LSU opens contact 67—3, thus de-energizing contactor U and stopping further upward movement of the spindle head 126. Contact U 51—19 now closes, and the upper limit contact 68—3 is closed through the operation of this switch as above described. Since TL 22—21 and TL 21—20 are already closed, the circuit is completed to energize contactor RC, thus shifting the table to quick traverse operation. Contactor L is energized at the same time, thereby starting the table motor to drive the table to the left in fast traverse. The opening of RC contact 2—30 operates to de-energize contactor SR to stop the spindle, at the same time disconnecting the SR interlock or holding contact 35—31. It will readily be seen that when the table is again slowed to a feed rate travelling to the left, that the starting of the spindle motor 159 will be controlled by the position of the spindle direction table left switch. With the operating cycle herein set forth, this switch is set to cause the circuit to be closed through the switch contact 35—74 to energize contactor SF to effect a clockwise rotation of the cutter spindle 124.

Inasmuch as the operation of the electrical controls to cause the cutter 294 to perform successive rough hook milling and finish conventional milling cuts on the work piece 296 located toward the right hand end of the table, is similar in all respects to the operation above described in connection with the milling of work piece 292 at the left hand end of the table, it is believed that no further detailed description thereof is necessary.

While the spindle raising and lowering mechanism above described, is of particular advantage for automatic operation in accordance with a variety of table operating cycles of which the above is an example, it will readily be seen that the electrical connections employed for raising and lowering the spindle head, are well adapted to be controlled directly by the operator, who has merely to press either of the control buttons on the panel 224 designated as Raise and Lower to move the spindle directly to the desired position. The shifting of the hand automatic switch 310 on the panel 224 to hand position, operates through the opening of switch contact 2—75 to render the raising and lowering of the spindle head 126 independent of the feed and traverse switch connections controlling the operation of the table. It will readily be seen from an inspection of Fig. 12 of the drawings, that the closing of the spindle lower control contact 2—46, operates directly to energize the contactor D to move the spindle head down. This downward movement is limited by the operation of the lower limit switch LSD2 which, therefore, operates under these conditions as a safety lower limit switch. The shifting of the switch 310 to hand position, operates also to close switch contact 67—68, thus rendering the spindle raise control button operative to move the spindle head upwardly independently of the position of the upper limit switch LSU. The closing of switch contact 67—68 has the further effect of permitting the quick traverse contactor RC to be energized for either position of upper limit switch LSU, so that the table can be moved at quick traverse independently of whether the spindle head is in its raised or lowered position.

In order to prevent excessive upward movement of the spindle head with consequent damage to the machine, an upper limit safety switch is provided designated in dotted lines at 350 in Figs. 4 and 5. This switch which may be similar in its general construction and mode of operation to the limit switch illustrated in Figs. 6 and 7, is actuated by means of a plunger 352 slidably mounted in the machine column 128, and arranged at one end to engage within a slot 354 in the stop rod 272. An excessive upward movement of the spindle head 126 will cause the plunger 352 to ride out of the cammed lower end of the slot 354, and open the upper safety switch contact 66—67 (see Figs. 11 and 12). In order to prevent any possibility of an excessive downward movement of the spindle head 126, a collar 358 is rigidly secured to the upper end of the stop rod 272 which serves to limit the adjustment of the stop brackets 276 and 288 upwardly on the stop rod 272.

The automatic control devices for applicant's machine above described including the mechanism for raising and lowering the spindle head, are well adapted also for automatic operation in accordance with an operating cycle in which a cutter spindle is brought to one level for the performance of one milling operation, is raised for a quick traverse movement of the table, and is again lowered to a second level for the performance of a second milling operation subsequent to which the cutter spindle is raised, and the work table returned at quick traverse to starting position. Figs. 13 and 14 illustrate a set-up of the machine for the performance of an operation of this type, in which two keyways 360 and 362 are to be cut in a motor shaft 364 suitably mounted on the work table 120.

In accordance with the set-up illustrated in these views, it is assumed that two actuating pins 278 and 280 (see Fig. 5) have been chosen, which are of the proper relative length, so that the pin 278 will engage with its plunger 245 to open the lower limit switch LSD1 as the milling cutter 365 (see Fig. 13) reaches the first operating level, and the pin 280 will engage with its plunger 247 to open the lower limit switch LSD2 as the milling cutter 365 reaches the second or lower operating level. In order to enable the head raising and lowering devices for the machine to operate in accordance with an operating cycle of this description, in which the cutter spindle 124 is lowered directly from its raised position to each of two work engaging positions at different levels, it has been found necessary in lowering the spindle head to the lower operating position, to provide means which may be rendered operative to short-circuit the lower limit switch LSD1, so that the spindle head may be permitted to continue its downward movement to the lower work engaging position as determined by the operation of the lower limit switch LSD2.

In the preferred construction illustrated, the short-circuiting of the lower limit switch contact 70—46, is accomplished by means of a mercury switch 366 which is readily controlled by means of the dogs 368 and 370 adjustably supported in the T-shaped slot 220 formed in the rear side of the table 120. These dogs are arranged to control the position of two plungers 372 and 374 supported in parallel relation to and to the rear of the fast-slow plungers 214 and 216 on a relatively stationary portion of the machine. The plungers 372 and 374 are connected by a pinion 375 and rock shaft 376 to the mercury switch 366, so that the depressing of the plunger 372 will operate to close the mercury switch 366, and at the same time to raise the plunger 374, and depressing of the plunger 374 will operate to open the mercury switch 366 and at the same time to raise the plunger 372.

The operation of the machine in accordance with the set-up illustrated in Figs. 13 and 14, for the cutting of the two keyways 360 and 362, may be briefly described as follows:—

Starting with the table in its position at the extreme left, the operator presses the fast-right button to move the table at a quick traverse rate to the right. As the work piece 134 is moved beneath the cutter 124, the feed dog 377 presses the feed-right button operating as above described, to stop the table and to start the spindle head 126 moving down. In the meantime, the dog 370 will have engaged with and moved the plunger 372 downwardly to close the mercury switch 366, and thus to short-circuit the lower limit switch LSD1. This downward movement therefore is not affected by the opening of LSD1 contact 70—46 as the pin 278 engages and depresses the switch actuating plunger 245, but continues until the pin 280 has contacted with the switch plunger 247 to open the lower limit switch LSD2, thus de-energizing the coils D and DR to stop the head motor 172, and starting the movement of the table at feed rate to mill the keyway 362. At the end of this milling operation, the traverse right dog 378 engages the fast-right button, causing the table again to stop, and starting the spindle head 126 moving upwardly. Upward movement of the spindle head 126 continues until the actuating pin 278 (see Fig. 4) has moved out of engagement with the plunger 245, thus permitting the upper limit switch LSU to be opened by the operation of the switch actuating lever 264, which causes the spindle motor 172 to stop and the table to start moving at the quick traverse rate to the right. During this traverse movement of the table, the dog 368 engages with and depresses the plunger 374, moving the mercury switch 366 to open position, and thus breaking the short-circuit around the lower limit switch LSD1. The continued movement of the table to the right, now causes the feed dog 380 to engage the feed right plunger, again stopping the table and causing the spindle 126 to start moving down. This downward movement continues until arrested by engagement of the pin 278 with the switch operating plunger 245 which acts to open the lower limit switch LSD1. With the mercury switch 366 in open position, the opening of LSD1 contact 70—46 operates to de-energize D to stop the head motor 172 and to start the table moving at the feed rate to the right for the milling of the keyway 360. At the completion of this milling operation, the fast-left dog 382 contacts with the fast-left button, operating to stop the table and to start the spindle head 126 moving upwardly to its inoperative position. The subsequent opening of the upper limit switch LSU contact 67—3, operates to stop the head motor 172 with the spindle head 126 in its fully raised inoperative position, and to start the return movement of the table at quick traverse rate to the 'left. This movement of the table continues until arrested by the engagement of a stop dog 384 with the machine stop button 386 which operates to stop the machine in its original starting position.

Certain features of applicants' machine relating specifically to the actuating and positioning mechanism for the spindle head, form the subject-matter of a divisional application Serial No. 313,866, filed January 15, 1940.

It will be understood that the invention is not limited to the specific embodiment shown, and that various deviations may be made therefrom without departing from the spirit and scope of the appended claims.

What is claimed is:

1. A milling machine having a work table, a rotary milling cutter spindle, a spindle support, means for effecting relative translatory movement of the work support and spindle support at feed and quick traverse rates, means for effecting relative movement of the work support and spindle support in a diverse direction from one to another of a plurality of work engaging and non-work engaging positions, control devices for the machine including means for controlling said translatory movement shiftable to effect said translatory movement interchangeably at a feed or quick traverse rate, and means rendered operative during the shift from one to another of said translatory rates to check said translatory movement and simultaneously to effect relative movement of the work support and spindle in said diverse direction.

2. A milling machine having a work table, a rotary milling cutter spindle, a spindle support, means for effecting relative translatory movement of the work support and spindle support at feed and quick traverse rates, means for effecting relative movement of the work support and spindle support in a diverse direction for moving the cutter spindle toward and away from the work from one to another of a plurality of work engaging and non-work engaging positions, and control devices for the machine including means for controlling said translatory movements shiftable to effect said translatory movement interchangeably at a feed or quick traverse rate, and means rendered operative during the shift from feed to quick traverse rate to stop said translatory movement and to relatively move the cutter and work table away from each other to non-work engaging position, and operative during the shift from quick traverse to feed position to stop said translatory movement and to relatively move the cutter spindle and work table toward each other to work engaging position.

3. A milling machine having, in combination, a work support, a rotary milling cutter spindle, a spindle support, means for effecting relative translatory movement of the work support and spindle support at feed and quick traverse rates, means for effecting relative movement of the work support and spindle support in a diverse direction for moving the cutter spindle toward and away from the work from one to another of a plurality of work engaging and non-work engaging positions, and control devices for the machine including a feed-quick traverse shift device for determining the rate of said translatory movement, means operative during the shift from one to the other of said translatory rates to check said relative translatory movement, and simultaneously to effect relative movement of the work support and cutter support from one to another of said work engaging and non-work engaging positions, and an interlocking device operative to effect translatory movement at the quick traverse rate only when said supports have been moved relatively to non-work engaging position, and to effect translatory movement at a feed rate only when said supports have been moved relatively to work engaging position.

4. A milling machine having, in combination, a work support, a rotary milling cutter spindle, a spindle support, means for effecting relative translatory movements of the work support and spindle support at feed and quick traverse rates, means for effecting relative movements of the work support and spindle support in a diverse direction for moving the cutter spindle toward and away from the work from one to another of a plurality of work engaging and non-work engaging positions, and control devices for the machine including a feed-quick traverse shift device for determining the rate of said translatory movement, means operative during the shift from feed to quick traverse rate to stop said translatory movement and to relatively move the cutter spindle and work table away from each other to non-work engaging position, said means including an interlock whereby translatory movement at the quick traverse rate can be effected only upon completion of said diverse movement to non-work engaging position, and means rendered operative during the shift from quick traverse to feed rate to stop said translatory movement, and to relatively move the cutter and work table toward each other to work engaging position, said latter means including an interlock whereby translatory movement at the feed rate can be resumed only when the cutter has reached the work engaging position.

5. A milling machine having, in combination, a work support, a rotary milling cutter spindle, a spindle support, means for effecting relative translatory movement of the work support and spindle support at feed and quick traverse rates, means for effecting relative movement of the work support and spindle support in a diverse direction for moving the cutter spindle toward and away from the work from one to another of a plurality of work engaging and non-work engaging positions, and an electrical control system for the machine including feed and quick traverse control switches for effecting said translatory movements alternatively at feed and quick traverse rates, secondary switch connections rendered operative upon the closing of the quick traverse control switch to stop said translatory movement and to relatively move the cutter spindle and table away from each other to non-work engaging position, and including a limit switch controlled by said relative movement to non-work engaging position to start said translatory movement at the quick traverse rate, and secondary switch connections rendered operative upon the closing of a feed control switch to stop said translatory movement and to relatively move the cutter spindle and table toward each other to work engaging position, and including a limit switch controlled by said relative movement to work engaging position to start said translatory movement at the feed rate.

6. A milling machine having, in combination, a movable work support, a drive for the work support including means shiftable for driving the work support alternatively at feed and quick traverse rates, a rotary milling cutter spindle, a spindle support, power means for moving the spindle support toward and away from the work support from one to another of a plurality of non-work engaging and work engaging positions, devices controlled by the movement of the work support for shifting the work support drive to cause the work support to move selectively at the feed or quick traverse rate, means rendered operative during the shift from feed to quick traverse rate to stop the work support and to move the spindle support to non-work engaging position, and operative during the shift from traverse to feed to stop the work support and to move the spindle support to work engaging position, and devices controlled by the movement of the spindle support to stop the continued movement of the spindle support in either direction, and thereafter to start work support movement at the selected rate.

7. A milling machine having, in combination, a movable work support, a drive for the work support including means shiftable for driving the work support alternatively at feed and quick traverse rates, a rotary milling cutter spindle, a spindle support, power means for moving the spindle support toward and away from the work support from one to another of a plurality of non-work engaging and work engaging positions, devices controlled by the movement of the work support for shifting the work support drive to cause the work support to move selectively at the feed or quick traverse rate, means rendered operative during the shift from feed to quick traverse rate to stop the work support and to move the spindle support to non-work engaging position, and operative during the shift from traverse to feed to stop the work support and to move the spindle support to work engaging position, a device controlled by movement of the spindle support to stop the spindle support in non-work engaging position and to start the work support movement at the traverse rate, and devices controlled by movement of the spindle support for stopping the spindle support selectively in one of a plurality of work engaging positions, and to start work support movement at the feed rate.

8. A milling machine having, in combination, a movable work support, a drive for the work support including means shiftable for driving the work support alternatively at feed and quick traverse rates, a rotary milling cutter spindle, a spindle support, a reversible electric motor for moving the spindle support toward and away from the work support from one to another of a plurality of non-work engaging and work engaging positions, an upper limit switch controlled by the movement of the spindle support to stop the spindle support in non-work engaging position, a plurality of lower limit switches and actuating connections therefor controlled by the movement of the spindle support for stopping the support in any one of a plurality of work engaging positions, and a selector device for rendering one or the other of said lower limit switches operative to stop the spindle motor.

9. A milling machine having, in combination, a movable work support, a drive for the work support including means shiftable for driving the work support alternatively at feed and quick traverse rates, a rotary milling cutter spindle, a spindle support, power means for moving the spindle support toward and away from the work support from one to another of a plurality of non-work engaging and work engaging positions, and an electrical control system for the machine including switch connections controlled by the movement of the table for shifting the work support drive to cause the work support to move selectively at the feed or quick traverse rate, secondary switch connections rendered operative during the shift from feed to quick traverse rate to stop the work support and to start the spindle motor moving the spindle support to non-work engaging position, and operative during the shift from traverse to feed to stop the work support and to start the spindle support motor moving the spindle support to the work engaging position, and limit switches controlled by the movement of the spindle support to stop spindle support movement in each direction, and to start table movement at the selected rate.

10. A milling machine having, in combination, a movable work support, a drive for the work support including means shiftable for driving the work support alternatively at feed and quick traverse rates, a rotary milling cutter spindle, a spindle support, power means for moving the spindle support toward and away from the work support from one to another of a plurality of non-work engaging and work engaging positions, and an electrical control system for the machine including switch connections controlled by the movement of the table for shifting the work support drive to cause the work support to move selectively at the feed or quick traverse rate, secondary switch connections rendered operative during the shift from feed to quick traverse rate to stop the work support, to move the spindle support to non-work engaging position, and to start the work support movement at the traverse rate, and operative during the shift from traverse to feed to stop the work support, to move the spindle support to work engaging position, and to start the work support movement at the feed rate, said secondary switch connections including an interlock whereby the work support can be moved at quick traverse only with the spindle support in non-work engaging position, and whereby the work support can be moved at the feed rate only with the spindle support in work engaging position.

11. A milling machine having, in combination, a work support, means for driving the work support including means for reversing the direction of support drive and rate changing means operable to drive the work support alternatively at a feed or traverse rate, a rotary cutter spindle adapted to support oppositely faced cutters thereon, means for starting, stopping and reversing the direction of spindle rotation, a spindle support, means controlled by said rate changing means for moving the spindle support away from the work support to non-work engaging position with a shift from feed to traverse, and for moving the spindle support toward the work support to work engaging position with a shift from traverse to feed, means controlled by the direction of table drive for controlling the direction of spindle drive, an interlocking device operative to prevent reversal of the spindle, and means operative upon a shift from feed to traverse to disengage the interlock.

12. A milling machine having, in combination, a work support, means for driving the work support including means for reversing the direction of support drive and rate changing means operable to drive the work support alternatively at a feed or traverse rate, a rotary cutter spindle adapted to support oppositely faced cutters thereon, means for starting, stopping and reversing the direction of spindle rotation, a spindle support movable toward and away from the work support from one to another of a plurality of non-work engaging and work engaging positions, and devices for controlling the work support in accordance with an automatic cycle for imparting feeding and return feeding movements from feed positions toward the limit of support travel in each direction, and quick traverse movements to the work support between said feed positions, means operative during the shift from feed to traverse to stop the work support and to move the spindle support to non-work engaging position and operative during the shift from traverse to feed to stop the work support and to move the spindle support to work engaging position, and means controlled by work support movement for driving the spindle in one direction during one of said work support feed and return movements and in the other direction during the other of said work support feed and return movements.

13. A milling machine having, in combination, a work support, a rotary cutter spindle adapted for supporting oppositely faced cutters thereon, a spindle support movable toward and away from the work support from one to another of a plurality of non-work engaging and work engaging positions, electrical driving and reversing means for the work support including left and right directional feed and traverse switch connections, switch connections operative during the shift from feed to traverse to stop the work support and to move the spindle support to non-work engaging position and operative during the shift from traverse to feed to stop the work support and to move the spindle support to work engaging position, and electrical driving and reversing means for the spindle comprising spindle reversing switch connections actuated by the table directional switch connections, an interlock in said spindle reversing switch connections operative to prevent reversal of the spindle, and spindle starting and stopping switch connections actuated from said traverse switch connections to stop the spindle and to disengage the interlock and by said feed switch connections to start the spindle in accordance with the setting of the spindle reversing switch connections.

14. A milling machine having, in combination, a movable work support, a rotary milling cutter spindle, a spindle support movable toward and away from the work support, electrical devices for controlling the operation and reversal of the work support including left and right directional feed and traverse switch connections, electrical devices for controlling the operation of the spindle support comprising switch connections controlled from said work support directional switch connections operative upon reversal of the work support at a feed rate to move the spindle support toward the work support, an interlock operative during spindle supprt movement to stop the work support, means controlled by the movemen of the spindle support to stop the spindle support in a predetermined position, and thereafter to start the return movement of the work support.

15. A milling machine having, in combination, a movable work support, a reversible drive for the work support including means shiftable for driving the work support alternatively at feed and quick traverse rates, a rotary milling cutter spindle, a spindle support, power means for moving the spindle support toward and away from the work support from one to another of a plurality of non-work engaging and work engaging positions, means operative upon a shift of said work support drive from feed to quick traverse rate to move the spindle support to non-work engaging position, operative upon a shift from traverse to feed to move the spindle support to a first work engaging position, and upon reversal of the table drive at a feed rate to move the spindle support to a second work engaging position, and devices operative during each of said spindle support movements to stop the continued movement of the work support in either direction, and thereafter to start work support movement at the selected rate.

16. A milling machine having, in combination, a movable work support, a rotary milling cutter spindle, a spindle support movable toward and away from the work support from one to another of a plurality of non-work engaging and work engaging positions, electrical devices for controlling the operation and reversal of the work support including left and right directional feed and traverse switch connections, electrical devices for controlling the operation of the spindle support comprising switch connections controlled from said work support directional switch connections operative upon a shift from feed to quick traverse rate to move the spindle support to non-work engaging position, operative during the shift from traverse to feed to move the spindle support to a first work engaging position, and operative upon reversal at a feed rate to move the spindle support to a second work engaging position, switch connections operative during the movement of the spindle support to stop the continued movement of the work support, and limit switches actuated by movement of the spindle support for stopping the spindle support in each of said positions and for starting work support movement at the selected rate.

17. A milling machine having, in combination, a work support, a rotary cutter spindle adapted to support oppositely faced cutters thereon, means for starting, stopping and reversing the direction of spindle rotation, a spindle support movable toward and away from the work support between a non-work engaging and a plurality of work engaging positions, electrical driving and reversing means for the work support including left and right directional feed and traverse switch connections, dogs on the work support for controlling the operation of the work support in accordance with an automatic cycle for imparting feeding and return feeding movements to the work support from feed positions toward the limit of support travel in each direction and quick traverse movement between said feed positions, means operative during the shift from feed to traverse to stop the work support and to move the spindle support to non-work engaging position, operative during the shift from traverse to feed to move the spindle support to a first work engaging position, and operative during reversal of the work support to stop the work support and move the spindle support to a second work engaging position, and means controlled by work support movement for driving the spindle in one direction during one of said feed and return feed movements, and in the other direction during the other of said feed and return feed movements.

18. A milling machine having, in combination, a work support, a rotary cutter spindle, a spindle support movable toward and away from the work support from one to another of a plurality of non-work engaging and work engaging positions, electrical driving and reversing means for the work support including left and right directional feed and traverse switch connections, switch connections controlled by said directional switch connections operative during the shift from feed to traverse to stop the work support and to start the spindle support moving to non-work engaging position, an upper limit switch actuated by spindle support movement to stop the spindle support in non-work engaging position and to start the work support movement at the traverse rate, switch connections controlled by said directional switch connections operative during the shift from traverse to feed to stop the work support and to start the spindle support moving to work engaging position, a lower limit switch actuated by spindle support movement to stop the spindle support and to start work support movement at the feed rate, a safety upper limit switch, and a safety lower limit switch operative to limit the extent of spindle support movement in each direction.

19. A milling machine having, in combination, a work support, a rotary cutter spindle, a spindle support movable toward and away from the work support from one to another of a plurality of non-work engaging and work engaging positions, electrical driving and reversing means for the work support including left and right directional feed and traverse switch connections, switch connections controlled by said directional switch connections operative during the shift from feed to traverse to stop the work support and to start the spindle support moving to non-work engaging position, on upper limit switch actuated by spindle support movement to stop the spindle support in non-work engaging position and to start work support movement at the traverse rate, switch connections controlled by said directional switch connections operative during the shift from traverse to feed to stop the work support and to start the spindle support moving to work engaging position, a lower limit switch actuated by spindle support movement to stop the spindle support and to start work support movement at the feed rate, manually operable switch controls for raising and lowering the spindle support, and a selector switch operable to render the spindle support switch controls independent of the work support directional switch connections.

20. A milling machine having, in combination, a work support, a rotary cutter spindle, a spindle support movable toward and away from the work support from one to another of a plurality of non-work engaging and work engaging positions, electrical driving and reversing means for the work support including left and right directional feed and traverse switch connections, switch connections controlled by said directional switch connections operative during the shift from feed to traverse to stop the work support and to start the spindle support moving to non-work engaging position, an upper limit switch actuated by spindle support movement to stop the spindle support in non-work engaging position and to start the work support movement at the traverse rate, switch connections controlled by said directional switch connections operative during the shift from traverse to feed to stop the work support and to start the spindle support moving to work engaging position, a lower limit switch actuated by spindle support movement to stop the spindle support and to start work support movement at the feed rate, manually operable switch controls for controlling the movement of the spindle support, a manual-automatic selector device operable to disable said work support controlled switch connections for the spindle support, and safety limit switches operable to positively limit movement of the spindle support in each direction.

21. A milling machine having, in combination, a movable work support, a drive for the work support including means shiftable for driving the work support alternatively at feed and quick traverse rates, a rotary milling cutter spindle, a spindle support, a reversible electric motor for moving the spindle support toward and away from the work support from one to another of a plurality of non-work engaging and work engaging positions, an upper limit switch cntrolled by the movement of the spindle support to stop the spindle support in non-work engaging position, a plurality of lower limit switches and actuating connections therefor controlled by the movement of the spindle support for stopping the support in any one of a plurality of work engaging positions at different levels, a selector device, and means including dogs on the work support for controlling said selector device to render one or the other of said lower limit switches operative to stop the spindle support motor.

22. A milling machine having, in combination, a work support, a rotary cutter spindle, a spindle support movable toward and away from the work support between a non-work engaging and a plurality of work engaging positions, electrical driving and reversing means for the work support including left and right directional feed and traverse switch connections, dogs on the work support for controlling the operation of the work support in accordance with an automatic cycle for imparting alternating traverse and feed movements to the table in one direction for the performance of successive milling operations, and thereafter a return traverse movement to the work support to starting position, means operative upon a shift from feed to traverse to stop the work support, to move the spindle support to non-work engaging position, and to start work support movement at the traverse rate, and operative upon a shift from traverse to feed to stop the work support, to move the spindle support to a work engaging position, and to start work support movement at the feed rate, limit switches controlled by movement of the spindle support for arresting movement thereof in each of said work engaging and non-work engaging positions, and selector means controlled by work support movement for rendering said limit switches selectively operable to stop the spindle support movement in the selected work engaging position.

23. A milling machine having, in combination, a work support, a rotary cutter spindle, a spindle support movable toward and away from the work support from one to another of a plurality of non-work engaging and work engaging positions, electrical driving and reversing means for the work support including left and right directional feed and traverse switch connections, electrical driving and control means for the spindle support including switch connections operating automatically upon the shift from feed to traverse to stop the work support and to start the spindle moving to non-work engaging position, and operative upon the shift from traverse to feed to stop the work support and to move the spindle support to work engaging position, limit switches for stopping spindle support movement and for starting work support movement at the selected rate including interlocking switch connections whereby work support movement at the selected rate can be effected only when the spindle support has actuated the corresponding limit switch, manually operable switch controls for the work support and spindle support, and a manual-automatic selector switch operable to render the spindle support switch controls independent of the work support directional switch connections, and to disable said interlocking switch connections whereby work support movement may be effected independently of the position of the spindle support.

EDWARD E. COFFIN.
AUGUST L. KRAUSE.